United States Patent
Powell et al.

(10) Patent No.: US 6,983,668 B2
(45) Date of Patent: Jan. 10, 2006

(54) PARK SOLENOID ASSEMBLY FOR AN INTERNAL ELECTRONIC TRANSMISSION RANGE SELECTION (ETRS) SYSTEM

(75) Inventors: Stephen W. Powell, South Lyon, MI (US); Mark A. Vernacchia, Northville, MI (US)

(73) Assignee: General Motors Corporation, Detroit, MI (US)

( * ) Notice: Subject to any disclaimer, the term of this patent is extended or adjusted under 35 U.S.C. 154(b) by 53 days.

(21) Appl. No.: 10/453,845

(22) Filed: Jun. 3, 2003

(65) Prior Publication Data

US 2004/0248687 A1    Dec. 9, 2004

(51) Int. Cl.
*F16H 56/00*    (2006.01)
(52) U.S. Cl. ...................................................... 74/335
(58) Field of Classification Search ................ 335/255, 335/257, 274, 280; 192/219.6; 74/335–6, 74/473.11–12, 473.21–28
See application file for complete search history.

(56) References Cited

U.S. PATENT DOCUMENTS

| | | | | |
|---|---|---|---|---|
| 5,078,242 A | * | 1/1992 | Ratke et al. | 477/96 |
| 5,179,868 A | * | 1/1993 | Thibeault | 74/335 |
| 6,698,555 B2 | * | 3/2004 | Schafer et al. | 188/170 |
| 6,701,797 B2 | * | 3/2004 | Heuver | 74/473.18 |
| 2004/0011609 A1 | * | 1/2004 | Schmid | 188/265 |

FOREIGN PATENT DOCUMENTS

| | | | | |
|---|---|---|---|---|
| JP | 361253224 A | * | 11/1986 | 180/271 |
| JP | 401199035 A | * | 8/1989 | 192/85 R |

\* cited by examiner

*Primary Examiner*—Roger Pang
(74) *Attorney, Agent, or Firm*—Leslie C. Hodges

(57) ABSTRACT

A solenoid assembly for implementation with an electronic transmission range selection (ETRS) system that shifts a transmission range between a park position and an out-of-park position. The solenoid assembly includes an extension arm biased against a member of the ETRS system. The extension arm is movable to an extended position to maintain the member in the out-of-park position. A solenoid is interconnected with the extension arm. The solenoid is operable to selectively move the extension arm between the extended position and a retracted position to selectively retain the member in the out-of-park position.

18 Claims, 7 Drawing Sheets

FIG 2  Park Mode

Out-of-Park Mode

PARK SOLENOID ASSEMBLY FOR AN INTERNAL ELECTRONIC TRANSMISSION RANGE SELECTION (ETRS) SYSTEM

FIELD OF THE INVENTION

The present invention relates to automatic transmissions and more particularly to an internal transmission range selection system using electronic controls.

BACKGROUND OF THE INVENTION

Motorized vehicles include a power plant (e.g., engine or electric motor) that produces driving power. The driving power is transferred through a transmission to a driveline for driving a set of wheels at selected gear ratios. As is well known, automatic transmissions shift automatically to the appropriate gear ratio based on various vehicle operating conditions including speed and torque. Typically, a desired transmission operating mode or range is selected by the vehicle operator. The ranges provided by most automatic transmissions generally include Park, Neutral, Reverse and Drive. In Drive, the automatic transmission automatically shifts between three, four, five or even six different forward gear ratios based on the vehicle operating conditions.

Traditionally, a driver interface device is provided which the vehicle operator shifts to select the desired transmission range. The driver interface device is linked to the automatic transmission by a range shift mechanism which typically includes a series of interconnected mechanical devices such as levers, push/pull rods, cables and the like. The number and size of such mechanical components make it difficult to package the range shift mechanism between the driver interface device and the transmission and can add significant frictional resistance to the overall system. As a result, the overall cost for design, manufacture and assembly of the vehicle is increased.

In an attempt to address such issues related to mechanically-shifted transmission range shift mechanisms, several "shift-by-wire" range shift mechanisms have been developed. Typically, a shift-by-wire range shift mechanism is based on an external system having an electric motor for controlling movement of the transmission's manual shaft to the desired range select position. Switches associated with the driver interface device send a mode signal to a transmission controller that is indicative of the selected transmission range. Thereafter, the controller actuates the electric motor to move the transmission manual shaft to the corresponding range select position. Drawbacks of conventional shift-by-wire systems include the size and weight of the external motor, the associated packaging issues related to the motor, the cost of the motor and the controller and the undesirable failure modes associated with such a device.

SUMMARY OF THE INVENTION

Accordingly, the present invention provides a solenoid assembly for implementation with an electronic transmission range selection (ETRS) system that shifts a transmission range between a park position and an out-of-park position. The solenoid assembly includes an extension arm biased against a member of the ETRS system. The extension arm is movable to an extended position to maintain the member in the out-of-park position. A solenoid is interconnected with the extension arm. The solenoid is operable to selectively move the extension arm between the extended position and a retracted position to selectively retain the member in the out-of-park position.

In one feature, the solenoid assembly further includes a plunger interconnecting the extension arm and the solenoid to pull the extension arm to the retracted position when the solenoid is de-energized.

In another feature, the solenoid assembly further includes a locking mechanism to selectively lock the extension arm in the extended position when the member is in the out-of-park position and the solenoid is energized. The locking mechanism includes an inner sleeve selectively actuated by the solenoid and bearings disposed between the inner sleeve and the extension arm. When the extension arm is in the extended position and the solenoid is energized the inner sleeve biases the bearings against the extension arm to prohibit movement of the extension arm to the retracted position. When the solenoid is de-energized a bias force of the inner sleeve against the bearings is relieved to enable movement of the extension arm to the retracted position. The extension arm and the inner sleeve each include respective conical faces in between which the bearings are wedged to retain the extension arm in the extended position when the solenoid is energized.

In still another feature, the solenoid assembly further includes a spring that biases the extension arm toward the member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
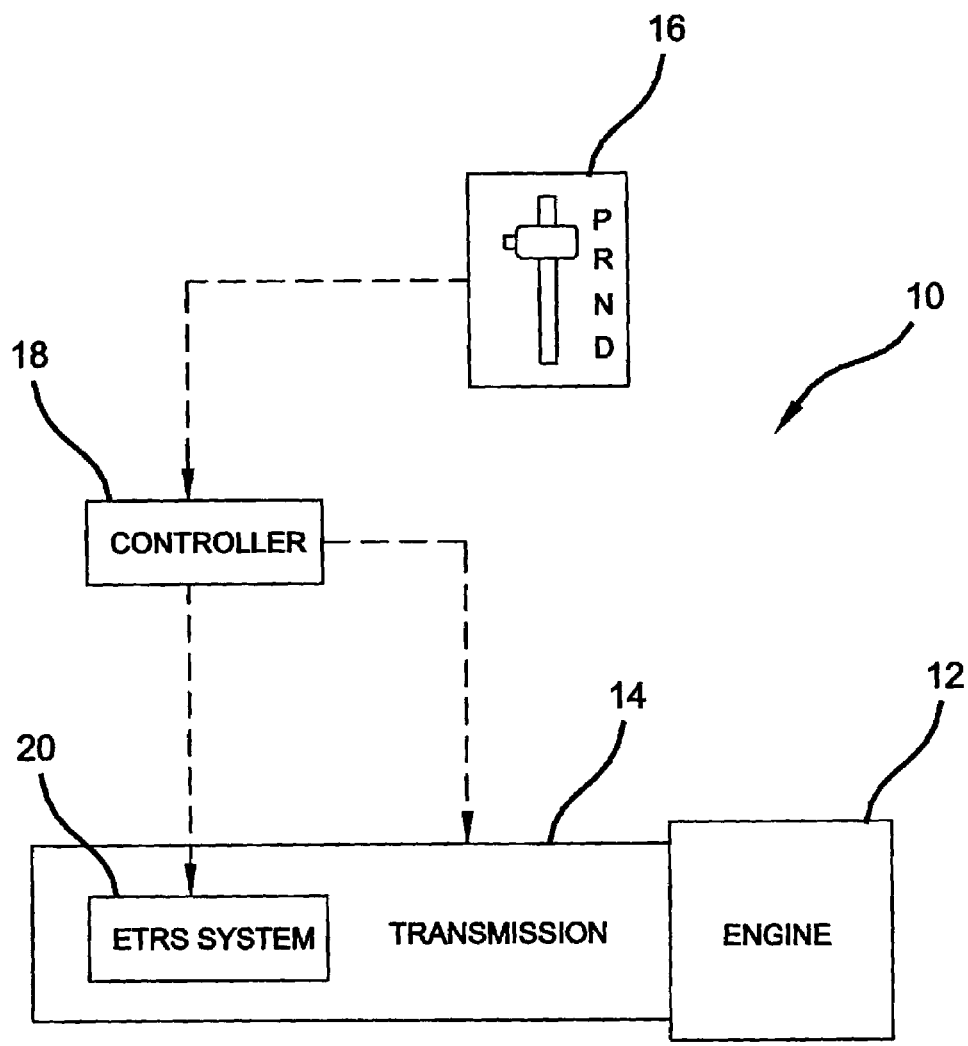
FIG. 1 is a schematic illustration of a vehicle system incorporating an electronic transmission range selection (ETRS) system according to the principles of the present invention.

Referring now to FIG. 1, a schematic illustration of a vehicle 10 is shown. The vehicle 10 includes an engine 12 and an automatic transmission 14. The engine 12 produces driving torque that is transferred through the transmission 14 at varying gear ratios to drive at least one pair of wheels (not shown). A driver interface device 16 enables a vehicle operator to select various transmission range positions. The driver interface device 16 can include a lever, switches, dials, push-buttons or any other type of input interface desired. The normal transmission range positions, including Park, Reverse, Neutral, and Drive (PRND) are selectable, as well as manual downshifts and tap-up, tap-down capabilities via actuation of the driver interface device 16. In operation, the driver interface device 16 sends an electric mode signal to a controller 18 based on the selected transmission range.

The controller 18 signals an electronic transmission range selection (ETRS) system 20 to shift the transmission 14 to the corresponding range in response to the electric mode signal. For purposes of clarity, the ETRS system 20 is considered to be operating in a "Park" mode when the transmission 14 is in its Park range and to be operating in an "Out-of-Park" mode when the transmission 14 is in any other of the available ranges.

Figure 2:
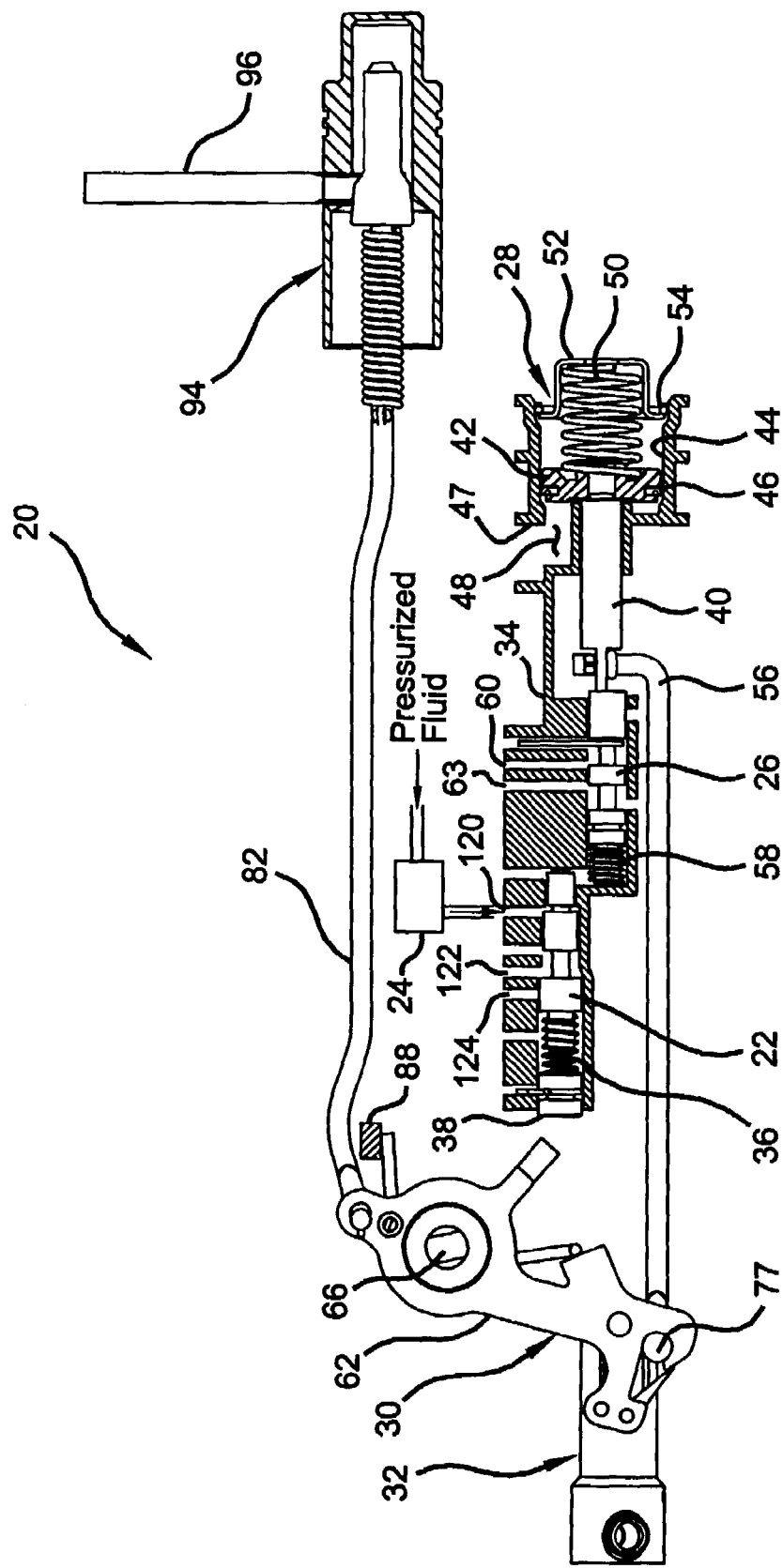
FIG. 2 is a side view of the ETRS system in a Park mode.

Referring now to FIG. 2, the ETRS system 20 is an integral part of the transmission 14 and is operable to manipulate the flow of pressurized fluid to shift the transmission 14 between its available transmission ranges. The ETRS system 20 includes a park servo valve 22, a park servo valve solenoid 24, a forward-reverse enable (FRE) valve 26, a hydraulic servo assembly 28 and a two-position detent lever assembly 30. The ETRS system 20 also includes a park solenoid 32 that prevents shifting from the Out-of-Park mode into the Park mode in the event of a loss of pressurized fluid under specific circumstances.

Figure 3:
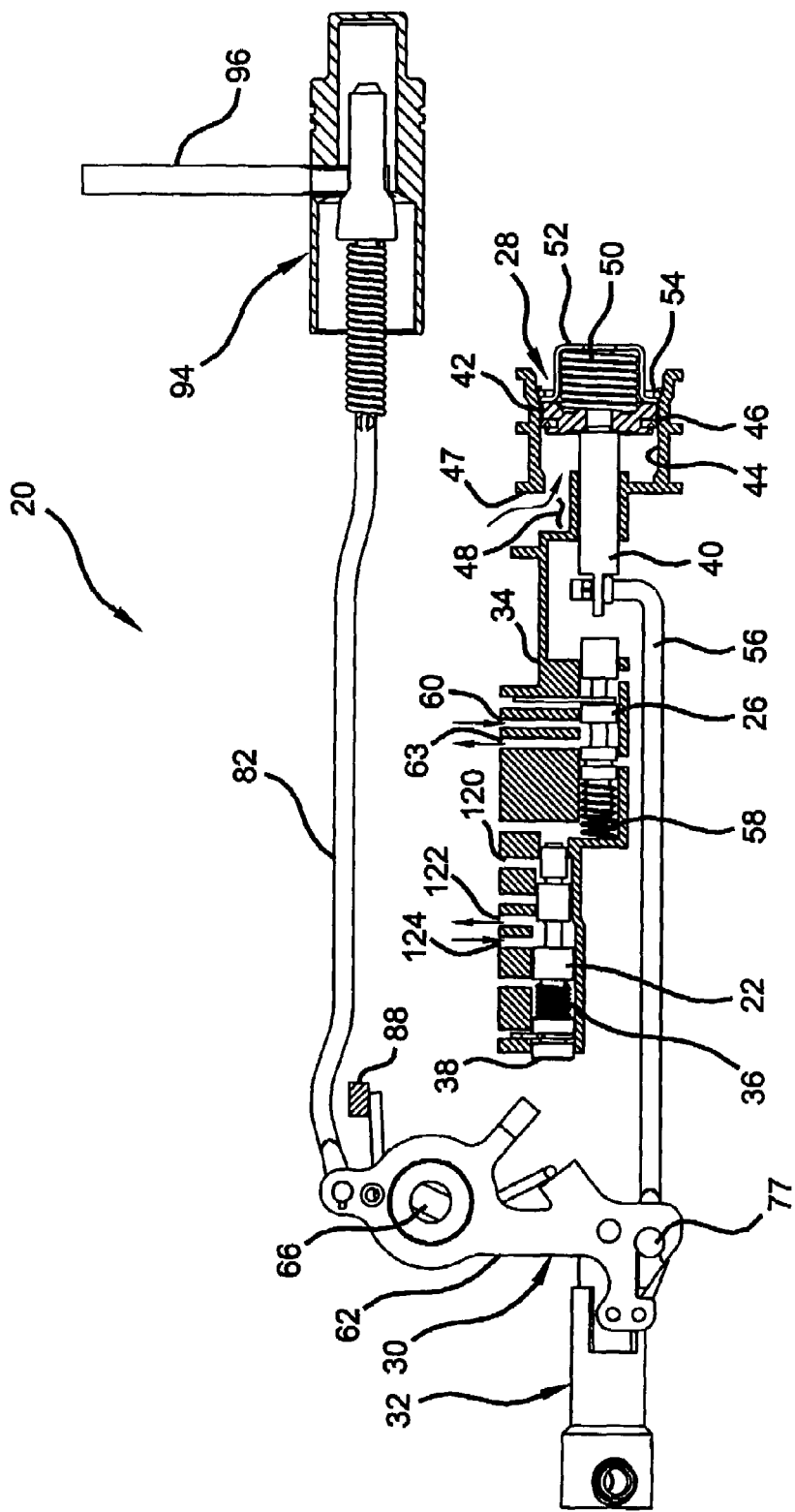
FIG. 3 is a side view of the ETRS system in an Out-of-Park mode.
Figure 4:
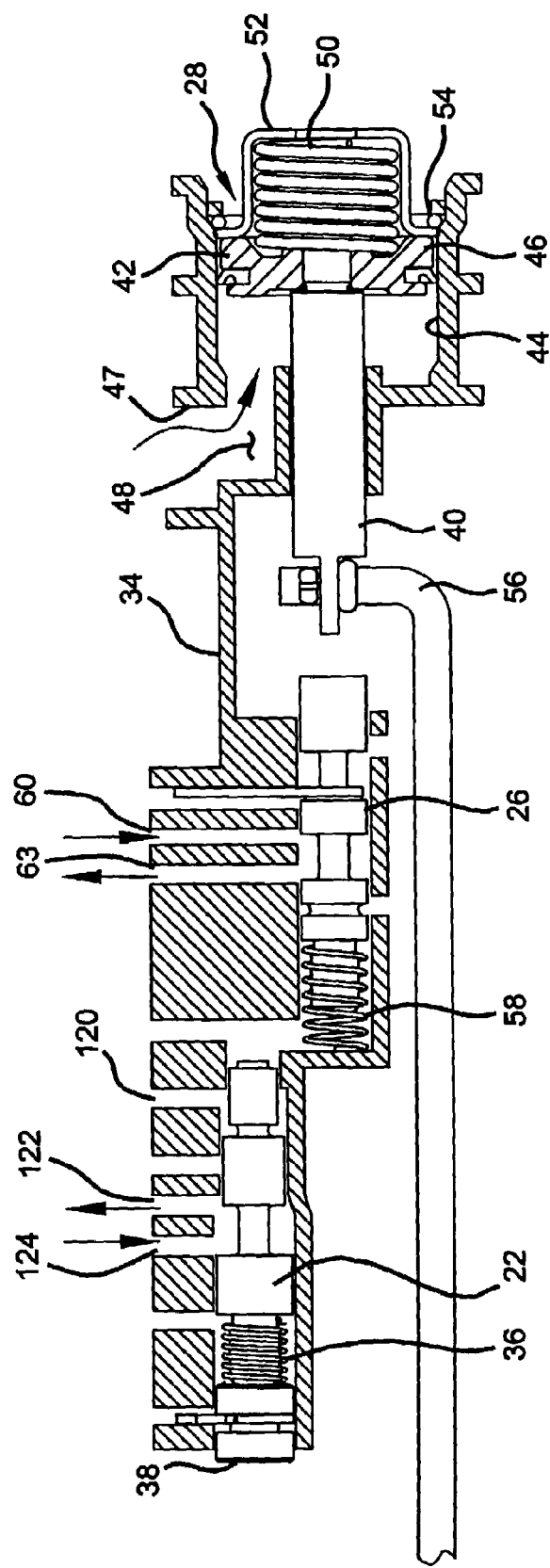
FIG. 4 is a detailed view of a portion of the ETRS system detailing pressurized fluid flow therethrough in the Out-of-Park mode.

Referring now to FIGS. 2 through 4, the ETRS components are shown supported within a housing 34 associated with the transmission 14 and which defines a valve body having a series of fluid flow passages. FIG. 2 illustrates the position of the various components when the ETRS system 20 is shifted into its Park mode. In contrast, FIGS. 3 and 4 illustrate the same components moved to positions corresponding to the ETRS system 20 operating in its Out-of-Park mode. In particular, the park servo valve 22 is slidably supported within the housing 34 for movement between a first position (FIG. 2) and a second position (FIG. 3). The park servo valve 22 is biased to its first position by a spring 36. The spring 36 is disposed between a fixed spring seat 38 and the park servo valve 22. In its first position, the park servo valve 22 prohibits the flow of pressurized fluid to the hydraulic servo assembly 28. As discussed in further detail below, the park servo valve solenoid 24 can be selectively actuated to control the supply of fluid required for moving the park servo valve 22 between its first and second positions.

Referring still to FIGS. 2 through 4, the hydraulic servo assembly 28 is shown to include a servo pin 40 having a servo piston 42 fixed to one end. The servo piston 42 is slidably supported within a cylinder 44 formed in the housing 34 and includes a piston seal 46 disposed therearound. A port 47 formed in the housing 34 provides a fluid communication path to a pressure chamber 48 formed within the cylinder 44. The servo piston 42 and servo pin 40 are biased to a first position (see FIG. 2) by a spring 50 and the detent lever assembly 30. The spring 50 seats between the servo piston 42 and a servo cap 52 that is fixed to the housing 34 by a retainer ring 54. An opposite end of the servo pin 40 abuts one end of the FRE valve 26 and is also fixed to a first end of an elongated servo link rod 56. The servo link rod 56 operably connects servo pin 40 to the detent lever assembly 30. As described in further detail below, the flow of pressurized fluid through the port 47 into the pressure chamber 48 induces movement of the servo piston 42 and servo pin 40 to a second position (see FIGS. 3 and 4) against the biasing force exerted thereon by the spring 50 and the detent lever assembly 30. Movement of the servo pin 40 from its first position to its second position causes the servo link rod 56 to likewise move from a first position (FIG. 2) to a second position (FIG. 3). Furthermore, such movement of the servo pin 40 to its second position acts to release it from engagement with the FRE valve 26.

The FRE valve 26 is slidably disposed within a valve chamber formed in the housing 34 for movement between a first position and a second position. When the servo pin 40 of the hydraulic servo assembly 28 is in its first position, the spring 50 and the detent lever assembly 30 hold FRE valve 26 in its first position (FIG. 2) in opposition to the biasing force exerted thereon by a spring 58. As seen, the spring 58 is seated between the FRE valve 26 and a wall portion of the housing 34. In its first position, the FRE valve 26 blocks the flow of pressurized fluid to the shifting components of the transmission 14. However, upon movement of the servo pin 40 of the hydraulic servo assembly 28 to its second position, the biasing force of the spring 58 forcibly moves the FRE valve 26 to its second position (FIGS. 3 and 4). With the FRE valve 26 in its second position, the flow of pressurized fluid from port 60 is permitted to the shifting components of transmission 14 through ports 60 and 63 at a desired line pressure.

Figure 5:
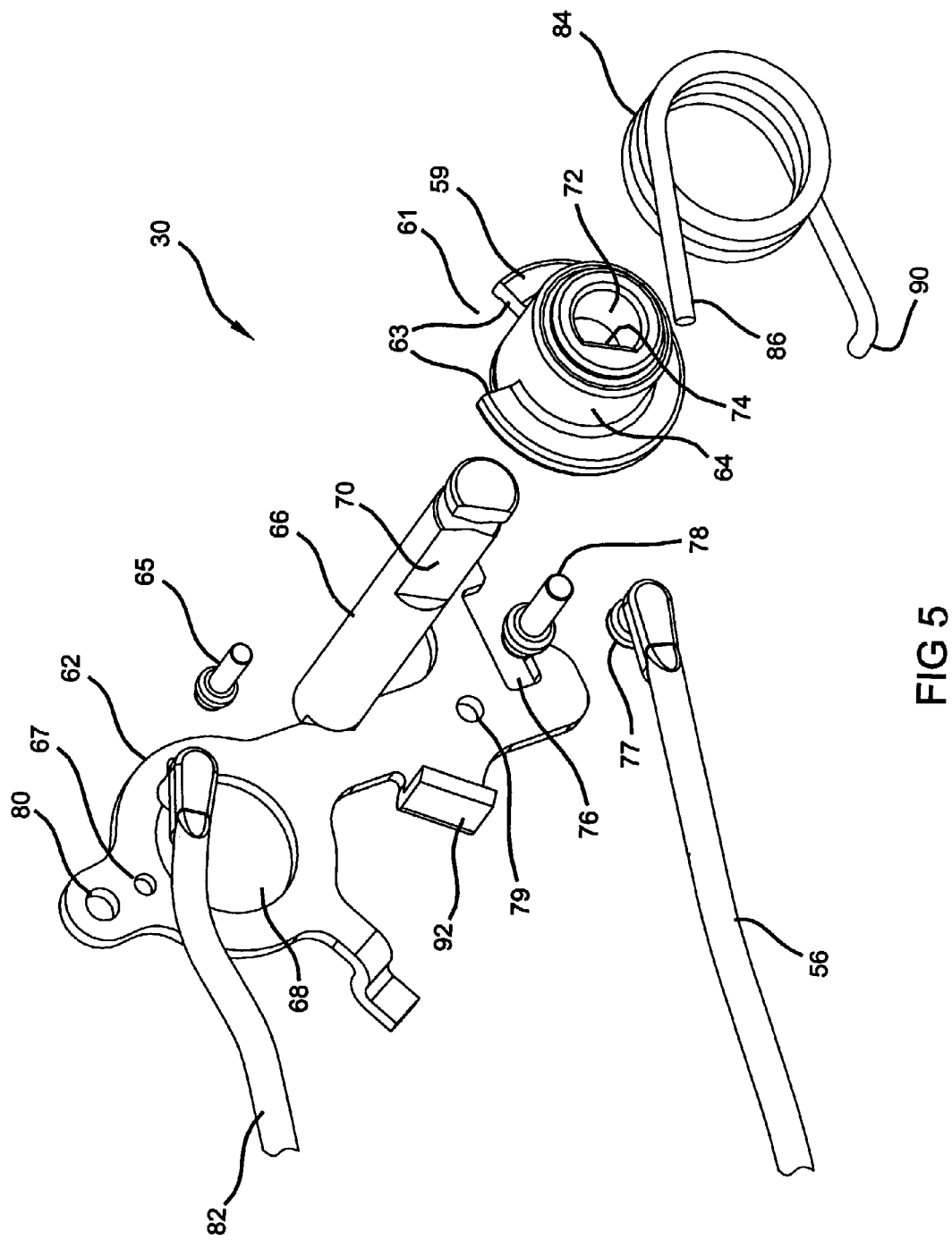
FIG. 5 is an exploded view of a detent lever assembly associated with the ETRS system of the present invention.

Referring primarily to FIG. 5, the detent lever assembly 30 is shown to include a detent lever 62, a bushing 64 and a manual shaft 66. The manual shaft 66 is rotatably supported in one or more aligned apertures in the transmission case and extends through the bushing 64. The bushing 64 is retained in an aperture 68 formed in the detent lever 62, whereby the detent lever 62 is rotatably supported by the bushing 64.

The manual shaft 66 includes a flat 70 formed along a portion thereof. The manual shaft 66 is received through a keyed aperture 72 of the bushing 64. In particular, the flat 70 of the manual shaft 66 engages a key 74 in the bushing 64, thereby fixing the manual shaft 66 and bushing 64 for concurrent rotation. However, the detent lever 62 is free to rotate about the bushing 64. As a result, during normal operation, the manual shaft 66 does not rotate as the ETRS system 20 is moved from the Park position to the Out-of-Park position, thereby eliminating any drag associated with a manual release mechanism external to the transmission 14.

The bushing 64 includes a raised circumferential flange 59 having a slot 61 which forms a pair of laterally-spaced engagement faces 63. A pin 65 extends from an aperture 67 in the detent lever 62 and into the slot 61 in the bushing 64. When the manual shaft 66 and the bushing 64 are induced to rotate, as discussed in further detail below, one of the engagement faces 63 eventually contacts the pin 65 to induce rotation of the detent lever 62. The open space provided by the arc length of the slot 61 defines a range of free-motion for the detent lever 62. That is to say, during normal operation, the detent lever 62 is rotatable relative to the bushing 64 with the pin 65 traveling within the slot 61 without contacting one of the engagement faces 63.

The detent lever 62 further includes a J-shaped slot 76 with a pin 77 fixed to the second end of the servo link rod 56 engaging the slot 76. As such, servo link rod 56 connects detent lever 62 to the servo pin 40 of hydraulic servo assembly 28. A park solenoid pin 78 extends from an aperture 79 in the detent lever 62 and, as will be detailed, interfaces with moveable components of the park solenoid 32. An aperture 80 formed through the detent lever 62 facilitates attachment of a first end of an actuator rod 82 to the detent lever 62. A torsion spring 84 is disposed about the bushing 64 and functions to bias the detent lever 62 to rotate to a park position (FIG. 2). A first end 86 of the torsion spring 84 rests against a stationary anchor portion 88 of the transmission case while a second end 90 of the torsion spring 84 engages a flange segment 92 of the detent lever 62.

The second end of the actuator arm 82 is coupled to, or engages, an actuator assembly 94 that is operable to selectively move a park lug 96 between a Park range position and the Out-of-Park range position. As will be detailed, movement of servo pin 40 from its first position to its second position causes the servo link rod 56 to pull on the detent lever 62. In response, the detent lever 62 is induced to rotate from its park position to an out-of-park position (FIG. 3) against the biasing force of the torsion spring 84. Such rotary movement of the detent lever 62 causes the actuator rod to move from a first position (FIG. 2) to a second position (FIG. 3) for moving park lug 96 to its Out-of-Park range position.

Figure 6:
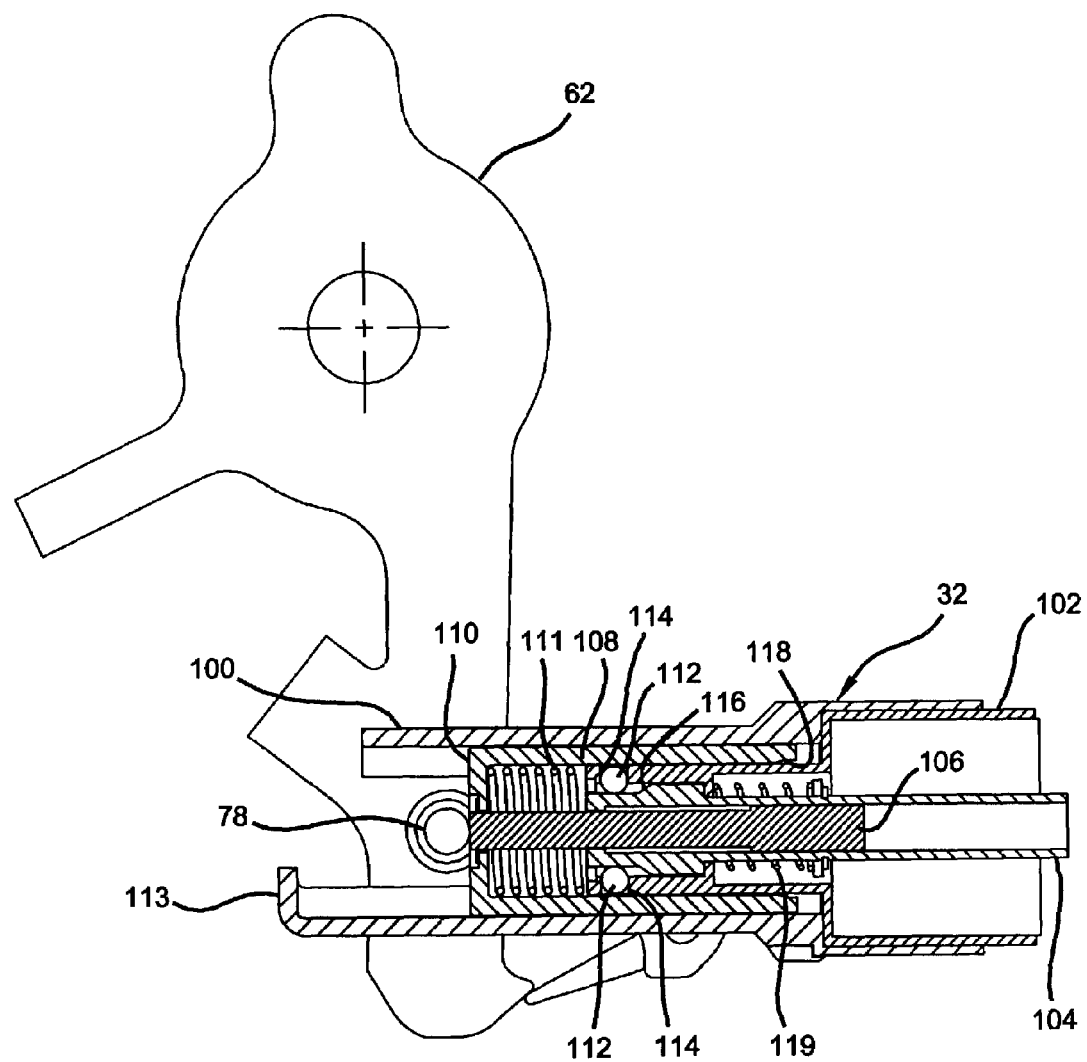
FIG. 6 is a cross-sectional view of a park solenoid assembly associated with the ETRS system shown in a Park position.
Figure 7:
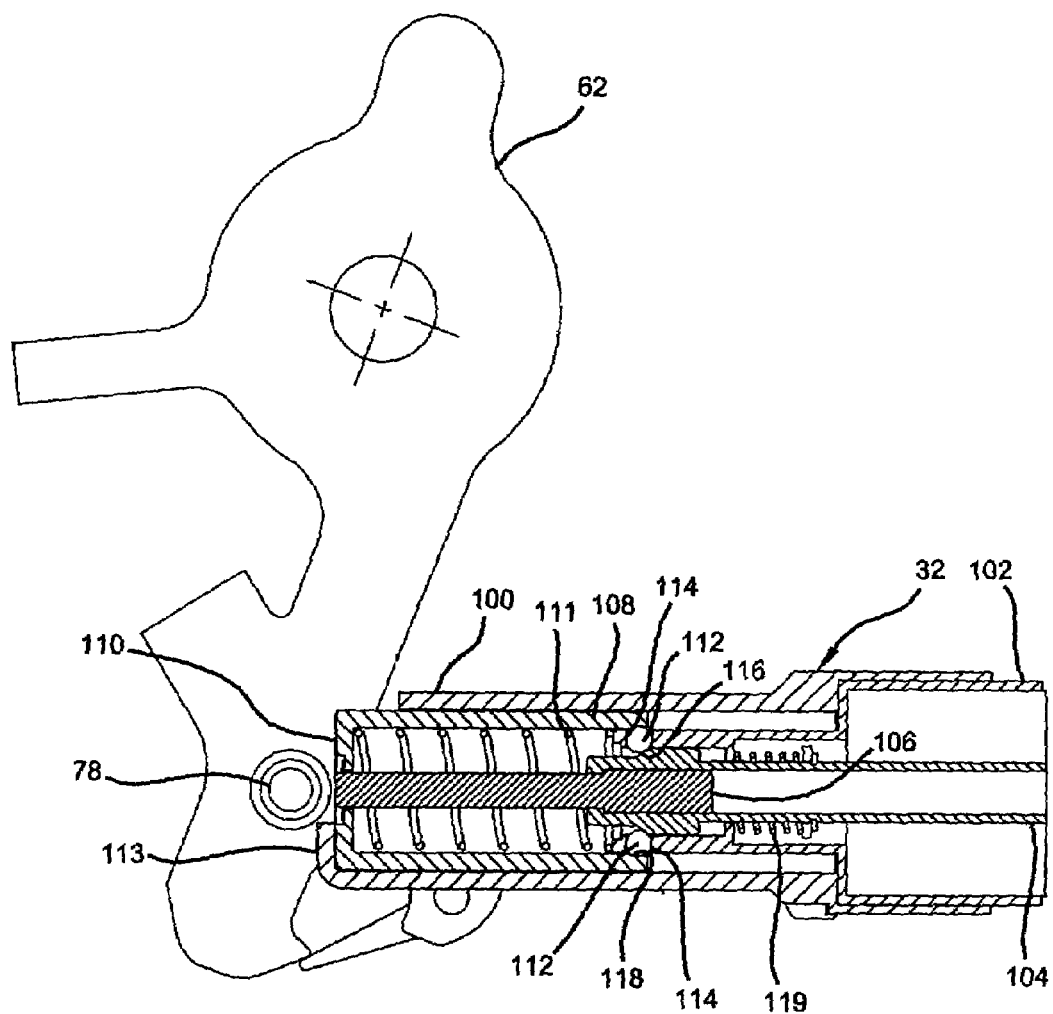
FIG. 7 is a cross-sectional view of the park solenoid assembly shown in an Out-of-Park position.

Referring now to FIGS. 6 and 7, the components associated with the park solenoid assembly 32 will be discussed in greater detail. The park solenoid assembly 32 includes an exterior body 100 that is attached to a portion of housing 34. The park solenoid assembly 32 also includes a solenoid body 102 which has a solenoid plunger 104, an extension arm rod 106 that is slidably disposed within the solenoid plunger 104, and an extension arm 108 that is slidably disposed on the solenoid body 102 and the exterior body 100. The extension arm rod 106 is fixed to slide with the extension arm 108. A front face 110 of the extension arm 108 is biased against the park solenoid pin 78 by a spring 111. As shown in FIG. 7, when the detent lever 62 is rotated to its out-of-park position, the extension arm 108 and extension arm rod 106 move toward an extended position under the biasing force exerted by the spring 111. Movement of the extension arm 108 to the fully extended position is limited by a flange 113 formed by the exterior body 100.

When the ETRS system 20 is in the Out-of-Park position, the extension arm 108 is able to move to the fully extended position under the biasing force of the spring 111 and is stopped by the flange 113. Under certain circumstances, for example when the vehicle 10 is traveling above a threshold speed, the controller 18 energizes the park solenoid assembly 32 to prevent movement of the solenoid plunger 104 by locking it in the previously staged Out-of-Park position. More specifically, bearings 112 are supported in apertures 114 of the solenoid body 102. As the solenoid plunger 104 is induced to extend, the bearings 112 ride up a conical face 116 of the solenoid plunger 104 and engage a conical face 118 of the extension arm 108. The interface between the bearings 112 and the conical faces 116,118 prohibit the extension arm 108 from moving back from its extended position. As such, the detent lever 62 is prohibited from rotating back as a result of the contact between the park solenoid pin 78 and the face 110 of the extension arm 108.

When the vehicle 10 is operating at or below the threshold speed, the park solenoid assembly 32 is de-energized to enable the ETRS system 20 to shift into the Park mode if so desired. More specifically, to enable rotation of the detent lever 62 back to its park position, the park solenoid assembly 32 is de-energized to enable the solenoid plunger 104 to return to the retracted position under the biasing force of a spring 119 to disengage the bearings 12. As the solenoid plunger 104 retracts, the extension arm 108 is pushed by the detent lever 62 against the bias of the spring 111 enabling rotation of the detent lever 62 to its park position if so indicated.

In operation, the vehicle operator selects a desired transmission range through manipulation of the driver interface device 16. The driver interface device 16 sends an electronic signal to the controller 18. The controller 18 commands a transmission range shift by sending an appropriate mode signal to the ETRS system 20. The transmission range shift includes shifting the transmission range from Park to an Out-of-Park range and enabling the flow of pressurized fluid at a desired transmission line pressure to shift components (not shown) of the transmission 14.

The signal sent from the controller 18 to the ETRS system 20 actuates the park servo valve solenoid 24 to enable flow of pressurized fluid to the park servo valve 22 through a port 120 (see FIG. 2). This flow of pressurized fluid causes movement of the park servo valve 22 from its first position to its second position. With of the park servo valve 22 located in its second position, pressurized fluid is supplied from the park servo valve 22 to the hydraulic servo assembly 28. More specifically, the pressurized fluid flows into an inlet port 124 of the park servo valve 22 and through an outlet port 122 and the port 47 into pressure chamber 48 of the hydraulic servo assembly 28. This flow of pressurized fluid into the pressure chamber 48 causes movement of the servo pin 40 from its first position to its second position, in opposition to the biasing of spring 50. Such sliding movement of servo pin 40 causes corresponding movement of the servo link rod from its first position to its second position which, in turn, causes rotation of the detent lever 62 from its park position to its out-of-park position. Such rotation of the detent lever 62 induces a pulling force on the actuator rod 82, thereby shifting the transmission range to the Out-of-Park position.

Concurrently, movement of the servo pin 40 of the hydraulic servo assembly 28 to its second position enables movement of the FRE valve 26 from its first position to its second position due to the biasing force of the spring 58. Movement of the FRE valve 26 to its second position permits flow of pressurized fluid from port 60 to port 63. This flow of pressurized fluid is provided to the shifting components of the transmission 14 at the desired line pressure, enabling the transmission 14 to shift to the desired range.

Following actuation of the ETRS system 20 into its Out-of-Park mode (see FIGS. 3 and 4), the park solenoid assembly 32 is actuated. In particular, the extension arm 108 contacts the park solenoid pin 78, thereby prohibiting the detent lever 62 from rotating back to its park position. The park solenoid assembly 32 maintains the extension arm 108 in its extended position while the vehicle 10 is traveling above the threshold speed. In the event of a loss of fluid pressure, the actuator assembly 94 is prevented from shifting the transmission range into Park while the vehicle is moving. Once the vehicle 10 is below the threshold speed, and assuming there is no fluid pressure holding the ETRS system 20 in the Out-of-Park mode, the park solenoid assembly 32 is de-energized to retract the extension arm 108 and permit the torsion spring 84 to rotate the detent lever 62 to shift the transmission range into the Park position.

The ETRS system 20 can be manually actuated in the event of a loss of electrical power and fluid pressure within the vehicle 10. An accessible handle or cable (not shown) is connected for rotation with the manual shaft 66. A vehicle operator or maintenance personnel can manually rotate the manual shaft 66 using the handle or cable to induce rotation of the detent lever 62 from its park position to its out-of-park position. As described above, rotation of the detent lever 62 enables shifting of the transmission range to the Out-of-Park position. In this manner, the vehicle 10 is free to roll without the transmission prohibiting rolling motion.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A solenoid assembly for implementation with an electronic transmission range selection (ETRS) system that shifts a transmission range between a park position and an out-of-park position, comprising:
   an extension arm biased against a member of said ETRS system, said extension arm movable to an extended position to maintain said member in said out-of-park position;
   a solenoid interconnected with said extension arm, said solenoid operable to selectively move said extension arm between said extended position and a retracted position to selectively retain said member in said out-of-park position; and
   a plunger interconnecting said extension arm and said solenoid to pull said extension arm to said retracted position when said solenoid is de-energized.

2. The solenoid assembly of claim 1, further comprising a locking mechanism to selectively lock said extension arm in said extended position when said member is in said out-of-park position and said solenoid is energized.

3. The solenoid assembly of claim 2, wherein said locking mechanism comprises:
   an inner sleeve selectively actuated by said solenoid; and
   bearings disposed between said inner sleeve and said extension arm, wherein when said extension arm is in said extended position and said solenoid is energized said inner sleeve biases said bearings against said extension arm to prohibit movement of said extension arm to said retracted position.

4. The solenoid assembly of claim 3, wherein when said solenoid is de-energized a bias force of said inner sleeve against said bearings is relieved to enable movement of said extension arm to said retracted position.

5. The solenoid assembly of claim 3, wherein said extension arm and said inner sleeve each include respective conical faces in between which said bearings are wedged to retain said extension arm in said extended position when said solenoid is energized.

6. The solenoid assembly of claim 1, further comprising a spring that biases said extension arm toward said member.

7. An electronic transmission range selection (ETRS) system for shifting a transmission range of a transmission, comprising:
   a park servo valve movable between a first position to inhibit a first flow of pressurized fluid and a second position to enable said first flow of pressurized fluid;
   a hydraulic servo assembly movable between a first position and a second position based on said first flow of pressurized fluid;
   a detent lever assembly interconnected with said hydraulic servo assembly and rotatable between a first position and a second position;
   a solenoid assembly to selectively maintain said detent lever assembly in said second position, said solenoid assembly comprising:
      an extension arm biased against said detent lever assembly, said extension arm movable to an extended position to maintain said detent lever assembly in said second position; and
      a solenoid interconnected with said extension arm, said solenoid selectively operable to move said extension arm between said extended position and a retracted position to selectively retain said detent lever assembly in said second position.

8. The ETRS system of claim 7, further comprising a plunger interconnecting said extension arm and said solenoid to pull said extension arm to said retracted position when said solenoid is de-energized.

9. The ETRS system of claim 7, further comprising a locking mechanism to selectively lock said extension arm in said extended position when said detent lever assembly is in said second position and said solenoid is energized.

10. The ETRS system of claim 9, wherein said locking mechanism comprises:
    an inner sleeve selectively actuated by said solenoid; and
    bearings disposed between said inner sleeve and said extension arm, wherein when said extension arm is in said extended position said inner sleeve biases said bearings against said extension arm to prohibit movement of said extension arm to said retracted position.

11. The ETRS system of claim 10, wherein when said solenoid is de-energized a bias force of said inner sleeve against said bearings is relieved to enable movement of said extension arm to said retracted position.

12. The ETRS system of claim 10, wherein said extension arm and said inner sleeve each include respective conical faces in between which said bearings are wedged to retain said extension arm in said extended position when said solenoid is energized.

13. The ETRS system of claim 7, further comprising a spring that biases said extension arm toward said detent lever assembly.

14. The ETRS system of claim 7, further comprising an actuator arm interconnected to said detent lever, wherein when said hydraulic servo assembly moves to said second position said actuator arm shifts said transmission range from a park position to an out-of-park position.

15. The ETRS system of claim 7, further comprising a park servo valve solenoid that manipulates a second flow of pressurized fluid to move said park servo valve from said first position to said second position based on an electric signal.

16. The ETRS system of claim 7 further comprising a forward-reverse enable (FRE) valve movable between a first position to inhibit line pressure to said transmission and a second position to provide line pressure to said transmission.

17. The ETRS system of claim 16 wherein said FRE valve is biased in said first position by said hydraulic servo assembly.

18. The ETRS system of claim 17 wherein said FRE valve is biased in said second position by a spring when a bias force of said hydraulic servo assembly is relieved.

* * * * *